United States Patent [19]

Trew

[11] Patent Number: 5,936,661
[45] Date of Patent: Aug. 10, 1999

[54] INTERACTIVE TELEVISION GAME SYSTEM

[75] Inventor: Timothy I. P. Trew, Horley, United Kingdom

[73] Assignee: U.S. Philips Corporation, New York, N.Y.

[21] Appl. No.: 08/752,365

[22] Filed: Nov. 19, 1996

[30] Foreign Application Priority Data

Nov. 22, 1995 [GB] United Kingdom .................... 9523869

[51] Int. Cl.[6] ........................................................ H04N 7/10
[52] U.S. Cl. ................................ 348/13; 348/12; 345/327
[58] Field of Search ................................. 348/2, 6, 7, 10, 348/12, 13, 461, 460, 462, 463, 465, 467, 473–485; 455/3.1, 3.3, 4.1, 4.2, 5.1, 6.1, 6.2, 6.3; 345/327, 328; H04N 7/10

[56] References Cited

U.S. PATENT DOCUMENTS 5,343,239   8/1994   Lappington et al. .
5,537,143   7/1996   Steingold et al. ........................ 348/13

FOREIGN PATENT DOCUMENTS

0620688A2   4/1994   European Pat. Off. .
07023356    6/1993   Japan .
WO9515654   11/1994  WIPO .

*Primary Examiner*—Nathan Flynn
*Attorney, Agent, or Firm*—Edward W. Goodman

[57] ABSTRACT

An interactive television system includes television transmission apparatus (TTA), a transmission path (TPA) and a plurality of television receivers (TRA-1 to TRA-n). The television receivers include a telephone interface (TRT-1 to TRT-n) by which they can communicate with the television transmission apparatus (TTA).

The system is arranged to enable interactive games to be played where viewers compete with contestants in a television studio. For a first portion of the program the viewers compete independently and the television receiver accumulates the score. For the final stages of the program viewers with a score above a transmitted threshold are invited to.

28 Claims, 4 Drawing Sheets

| USER'S ACTION | SYSTEM'S RESPONSE |
|---|---|
| <br>'e' |  |
| |  |
| <br>GREEN |  |
| |  |

INTERACTIVE TELEVISION GAME SYSTEM

BACKGROUND OF THE INVENTION

The invention relates to a method of performing a quiz show using an interactive television system, to a television transmitter for an interactive television system, to a method of generating a television signal for use in an interactive television system, and to a television receiver for use in an interactive television system.

FIELD OF THE INVENTION

An interactive television game show is known in which the viewer participates in a game being broadcast from a television studio. The broadcaster transmits via teletext signals multiple choice answers which are displayed on the television screen superimposed on the transmitted picture. These multiple choice answers are colour coded so that the viewer may select an answer by pressing an appropriate key on the receiver's associated remote control device. Conveniently the color coded answers may take the colors used for the selection of Fastext pages in the UK teletext system. The receiver includes means for checking whether the correct answer has been selected and allocating marks for that answer. The broadcaster will have included, in the teletex transmission associated with the game show, the multiple choice answers, the correct one of the answers, and the marks to be awarded for a correct answer and, optionally, marks to be deducted for an incorrect answer. Also transmitted via teletext is a blocking signal which prevents answers being entered once competitors in the studio start answering the question. The blocking signal can be generated, for example, by monitoring a buzzer which the studio participants have to sound before answering the question.

At the end of the show, the marks are accumulated and the broadcaster invites viewers to send in their accumulated marks with prizes for the best scores. This may be achieved by connecting to a telephone and using multi-frequency tones to encode the scores read from the microprocessor in the television receiver. There are, however, various ways of cheating which can be employed to defeat this arrangement using, for example, video recorders.

U.S. Pat. No. 4,592,546 discloses an interactive television system in which viewers predict events in a game and are allocated scores in dependence on the correctness of the prediction. In this case, to avoid cheating, a series of timers are randomly started by a signal from the transmission end and their state is transmitted back to the transmitting end at the same time as the score. The state of these counters is then compared with corresponding timers at the transmission end and the score is only accepted if the counters at both ends have the same states. This increases the difficulty of cheating by time shifting the recorded signal using video recorders but requires the transmission of more information and greater complexity of equipment at both the transmission source and the receivers.

SUMMARY OF THE INVENTION

It is an object of the invention to enable viewers of an interactive television system to take part in game shows while reducing the opportunities for cheating.

The invention provides a method for performing a quiz show with studio participants using an interactive television system, the method comprising the steps i) transmitting live, a quiz show in which questions are asked of studio participants ii) transmitting answers to the questions at an appropriate time in the program iii) transmitting a signal which determines the time during which viewers are allowed to answer the questions;

iv) allocating scores to correctly answered questions;

v) at a given time during the quiz show, inviting viewers who have accumulated a qualifying score to take part live in the quiz show with the studio participants;

vi) providing each of the invited viewers with a communication link to the studio to enable live participation;

vii) receiving answers in real time from the invited viewers for the remainder of the quiz show; and viii) accumulating the scores of both the invited viewers and the studio participants to determine the winner(s).

By causing the viewers with the highest marks at a late part of the show to participate live in the game, the possibility of winning major prizes by cheating is reduced since they will go to the eventual winners who will need to have answered some of the questions live. Thus a small number of viewers are connected directly to the studio, for example, by telephone and are answering the questions at precisely the same time as the studio contestants. As a result, time shifting of the answers by use of video recorders or defeating any inhibit signal sent by the broadcaster becomes ineffective for at least the final stage of the game. Consequently, the major prizes can only be won by taking part in the in the live final stages of the game but the initial stages are played in isolation and only those who have achieved a good score are invited to take part live in the final stages. As a result, only a small number of participants have to be connected to the studio over communications links.

The communication link may comprise a line in a public telephone network. Alternatively, if the interactive television system forms part of a cable television network, the communication link may comprise a return channel in the cable television network.

An inhibit signal may be transmitted for each question, which inhibit signal determines the end of the time during which the viewer is allowed to answer the question. This inhibit signal may be sent when a studio contestant starts to answer a question so that the viewer is not prompted by the studio contestant's answer. Thus unless the viewer enters the answer to the question before the studio contestant starts to answer a question, the answer from the viewer is locked out. The inhibit signal may be generated, for example, when the studio contestant presses a buzzer to answer the question.

An alternative would be to set a fixed time response but this would involve placing restraints on the participants in the studio who could not be allowed to answer before that fixed time expired or the participants at home would be able to use their answers.

The qualifying score may be progressively reduced until sufficient viewer participants are obtained.

The broadcaster will want a small number of live participants from the home viewers and to achieve this, may start by inviting only those with maximum, or near maximum, marks. This may, however, result in no (or too few) participants, and to overcome this problem, the required marks may be reduced until sufficient participants are achieved.

Multiple choice answers may be transmitted to the viewers and scores allocated to each question may also be transmitted to enable total scores to be accumulated. This allows easy input of the answers to the questions which may be, for example, by means of a remote control unit having keys corresponding to colours displayed on the screen adjacent each multiple choice answer. Alternatively, the multiple choice answers may be displayed in individual colours to enable easy selection by means of color coded keys on a remote control unit. Scores may be transmitted so that individual questions may be allocated different numbers of marks depending on their difficulty.

The invention further provides television transmission apparatus for use in an interactive television system, the television transmission apparatus comprising means for generating television signals representing a quiz show, means for generating answers to each of the questions asked and transmitting them in an auxiliary data channel, and means for generating at a given point in the quiz show a request signal inviting viewers of the quiz show a to participate live on the remainder of the quiz show if their total score up to the time of receiving the request signal, reaches at least a given value.

The provision of such television transmission apparatus enables the method of the invention to be performed by a television service provider. Thus, by transmitting a television quiz show and allowing viewers to answer the questions asked in the studio the viewers can accumulate a score in the same way as the studio participants and compete directly with those participants. By generating, at a given point in the quiz show, a request signal inviting viewers to participate live for the remainder of the quiz show, it can be ensured that the main prizes are only open to those who take part in the later stages of the quiz show live. This minimizes the possibility of viewers cheating since there will be no great monetary incentive for them to do so as the major prizes can only be obtained by participating live in at least some of the quiz show. Thus, if major prizes are available to viewers without participating live, there is a large incentive for them to discover ways of cheating in order to win those prizes. If, however the prizes are relatively small, the incentive to cheat is very much lower and the extent to which people will be prepared to go in order to win the smaller prizes will be much less than if the larger prizes were available to them.

Means for transmitting an inhibit signal to prevent a viewer answering a question after a studio participant starts to answer the question may be provided. This prevents the viewer from being prompted by the answer given by the studio participant. An alternative to transmitting an inhibit signal is to provide a timer within the receiver which prevents the viewer from answering a question a given time after the question has been asked. This would involve preventing the studio contestant from answering the question for that time period.

The answers may be transmitted in the form of multiple choice answers to be displayed and a non displayable correct answer for comparison with the answer selected by the viewer.

Multiple choice answers allow an easy entry of the answer by the viewer. For example, the answer may be entered by pressing one of a number of color keys on a remote control unit. Alternatively the multiple choice answers could be displayed in a numbered format so that the answer would be entered by pressing numbered keys. This gives a potentially unlimited number of choices.

The correct answer may be transmitted at a time later than the multiple choice answers. In this case, the correct answer could be displayed provided that it is transmitted after the time for answering the question had elapsed. It would be preferable that the correct answer is transmitted before the next question is asked or at least before the multiple choice answers for the next question are transmitted. This is not essential if sufficient memory is provided within the television receiver to enable the choices made to be stored and later compared with the correct answers.

Means for transmitting a score for each question may be provided. In this way, questions of differing difficulty may be allocated different marks. Such means is not of course necessary if every question is allocated the same mark.

The auxiliary data channel may be carried in the vertical blanking interval of the television signal and may be a teletext channel, the answers being encoded in one or more teletext data packets. This enables the broadcaster to use the normal teletext data network, which is already in existence, for the purpose of sending the answers to the questions.

Means for reducing the given value until sufficient participants are obtained may be provided. In this way, the quiz show organizer can limit the number of viewers invited to participate live in the later stages of the quiz show by initially setting a high score to qualify for participation and reducing the score until sufficient participants are obtained.

The invention further provides a method of generating a television signal for use in an interactive television system, the television signal representing a quiz show, comprising the steps;

i) generating answers to each of the questions asked and inserting them in an auxiliary data channel, and ii) generating at a given point in the quiz show, a request signal inviting viewers of the quiz show to participate live on the remainder of the quiz show if their total score up to the time of receiving the request signal is equal to or exceeds a given amount.

Such a method may comprise the further step of generating an inhibit signal to prevent a viewer from answering a question after a studio participant starts to answer the question.

The alternative to this is to provide a given set time after the asking of the question before the studio participant can start to answer the question. In this particular case, the inhibit signal is inherent in the signal indicating the start of the asking of the question. Thus, as the answers are inserted into the auxiliary data channel, this will start a timer within the television receiver which allows the viewer to answer the question only until the timer times out.

Step i) of the method may comprise generating answers in the form of multiple choice answers for display by the viewer and generating the correct answer for comparison with the answer selected by the viewer.

If the multiple choice answers and the correct answer are both transmitted at the same time it is necessary that the correct answer is not displayed. It would equally be possible to transmit the correct answer only after the studio participant had answered the question. The comparison with the answer entered by the viewer can take place after the studio contestant has answered the question. This merely means that the answer provided by the viewer has to be stored until the correct answer is sent.

The method may comprise the further step of generating a score for each question and transmitting that score in association with the answer to the question.

This enables different scores to be allocated to different questions depending on their difficulty. It may be transmitted either when the multiple choice answers are transmitted or when the correct answer is transmitted. A further possibility is to transmit scores for all of the questions at a given point, for example the beginning of the show.

The invention still further provides a television receiver for use in an interactive television system and comprising means for receiving a television signal representing a quiz show, means for receiving, via an auxiliary data channel, answers to each question posed in the quiz show, means for enabling the viewer to answer each question posed, means for comparing the viewer's answer with the correct answer and allocating a score for that answer on the basis of the result of the comparison, means for accumulating the scores for each of the questions, means for receiving a signal inviting viewers whose accumulated scores at least reach a given value to participate live in the remainder of the quiz show, and means for requesting participation in the rest of the show if the accumulated score reaches the given value.

Such a television receiver will enable a viewer to take part in interactive television quizzes with the minimum possibility for cheating since there will be little incentive to do so as the major prizes will require the successful participation in the live part of the quiz show. There is therefore little benefit in inhibiting the action of the inhibit signal controlling the time during which answers can be entered or in time shifting the program using video recorders. It becomes very difficult to cheat once you have to answer questions live in the same time slot as the studio participants.

The television receiver may be arranged to receive multiple choice answers to the questions posed together with an indication of the correct answer, the receiver comprising means for displaying the multiple choice answers, means for enabling the viewer to select one of the multiple choice answers, and means for comparing the selected answer with the correct answer.

If the correct answer is sent at the same time as the multiple choice answers, it is, of course, necessary to ensure that the correct answer is not displayed. It could alternatively be sent at a later time once the answer to the question had been entered by the viewer, or at least after the time allowed to the viewer for entering his or her answer.

The television receiver may additionally comprise means for receiving an inhibit signal and means for preventing the viewer from entering an answer after receipt of the inhibit signal.

This inhibit signal will normally be transmitted by the television programme supplier who is running the quiz show and will be transmitted, for example, when a studio participant presses a buzzer in order to give the answer to the quiz master. This will then lock out the viewer's answer so that the viewer is unable to use the prompting of the studio participant's answer. In other words, the viewer has to enter the answer before the studio participant starts to answer.

The auxiliary data channel may be a teletext data channel and the answers may be encoded and transmitted in one or more teletext data packet, the television receiver comprising a teletext decoder and means for storing the correct answer for comparison with the viewer's answer.

The precise implementation of the television receiver will depend on the way in which the answers are transmitted by the program supplier. If, in the case of multiple choice answers, they are transmitted concurrently with the asking of the questions and the correct answer is also transmitted at that time, then the correct answer needs to be stored for comparison with the answer entered by the viewer, since that answer will be entered subsequent to the receipt of the correct answer. If, on the other hand, the multiple choice answers are sent concurrently with the asking of the question and the correct answer is not sent until after the viewer has selected one of the multiple choice answers, it is not necessary to store the correct answer for comparison but of course it will then be necessary to store the viewer's choice.

The inhibit signal may be transmitted in a teletext packet.

It is possible to transmit the inhibit signal in any auxiliary channel but the teletext channel is one which is provided in many countries and which has capacity which could be used for this purpose.

The means for enabling the viewer to answer the questions may comprise a remote control unit. It is well known that most television receivers sold currently include a remote control unit which contains a key pad and also further buttons, for example colored buttons which will access the Fastext pages or other linked pages in other teletext systems. The control software within the television receiver can be arranged so that these buttons can also be used for answering in particular multiple choice questions which can be colored coded and use the same colored coded keys as are used for Fastext. It is of course possible also to use the remote control unit in other ways, for example, if the questions are such that numerical answers are required, then the numeric keys on the remote control unit can be used.

It would also be possible to use other forms of input device, such as a device similar to a computer mouse or voice input if a voice recognition arrangement is built into the television receiver. A further possibility is a touch sensitive tablet on which the viewer could write the answers, such touch sensitive tablets are well known in the computer field and in the area of personal digital assistants.

The invention yet further provides a decoder for use in an interactive television system comprising means for receiving and decoding a television signal representing a quiz show, means for receiving, via an auxiliary data channel, and decoding answers to each question posed in the quiz show, means for enabling a viewer to answer each question posed, means for comparing the viewer's answer with the correct answer and allocating a score for that answer on the basis of the result of the comparison, means for accumulating the scores for each of the questions, means for receiving a signal inviting viewers whose accumulated scores at least reach a given value to participate live in the remainder of the quiz show, means for requesting participation in the rest of the show if the accumulated score reaches the given value, and means for feeding the decoded television signal to a television receiver.

When the decoder is arranged to receive multiple choice answers to the questions posed together with an indication of the correct answer, the decoder may comprise means for enabling the viewer to select one of the multiple choice answers, and means for comparing the selected answer with the correct answer.

The decoder may comprise means for receiving an inhibit signal and means for preventing the viewer from entering an answer after receipt of the inhibit signal.

The auxiliary data channel may be a teletext data channel, the answers being encoded and transmitted in one or more teletext data packets, the decoder then comprising a teletext decoder and means for storing the correct answer for comparison with the viewers answer.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
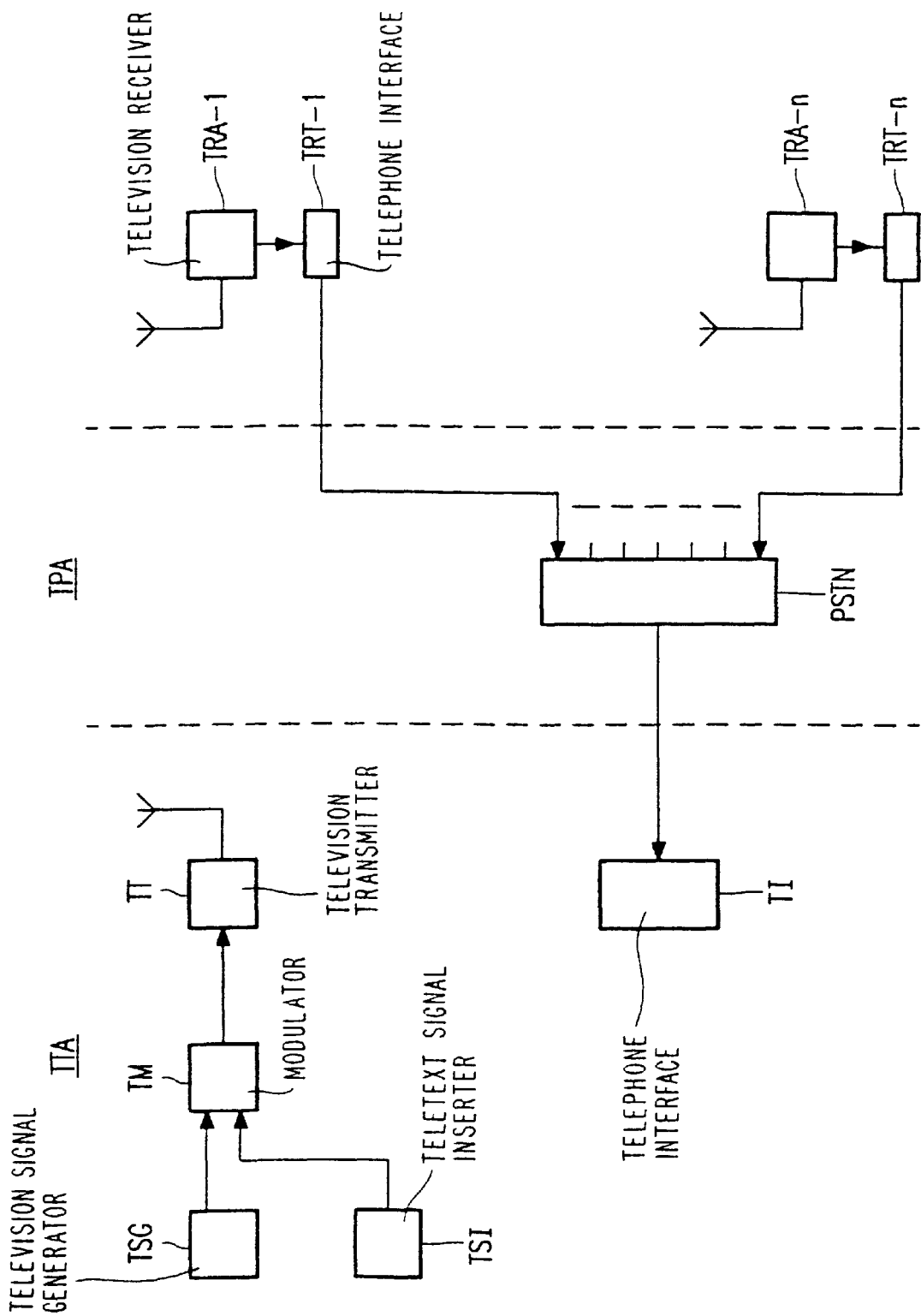
FIG. 1 shows, in block schematic form an interactive television system according to the invention.

FIG. 1 shows, in block schematic form, one embodiment of an interactive television system according to the invention which comprises television signal generation and transmission apparatus TTA, a plurality of interactive television receiver arrangements TRA-1 to TRA-n, and a two way transmission path TPA. The television signal generation and transmission apparatus TTA comprises a television signal generator TSG, which may be conventional studio equipment, and a teletext signal inserter TSI, which again may be of known form, which are together fed to a modulator TM which assembles the video and teletext signals into an appropriate form for transmission, for example, encoded according to the PAL system. The encoded signal is then passed to a television transmitter TT for broadcast over a suitable transmission medium TPA, for example, by satellite, terrestrial radio waves, or cable. The television receivers TRA-1 to TRA-n comprise conventional television receivers which have certain additional features provided. These features include a telephone interface TRT-1 to TRT-n which enable communication, for example via the public switched telephone network (PSTN), between the receivers and the television studio originating the program being viewed. The television studio, which forms part of the television signal generating and transmission apparatus TTA, includes a telephone interface TI which receives signals from the television receivers TRA-1 to TRA-n via the public telephone network PSTN.

The system shown in FIG. 1 may be used to enable viewers to take part in television games shows and quizzes. These may be conventional game show having additional information transmitted to allow the viewers to compete at home with locally-generated text overlaid on the TV program, without a real-time reverse channel. The viewers can transmit their score via the telephone line either on specific invitation from the program provider during the show or after the end of the game.

They are distinguished from Games on Demand (GoD) in that they are played at a specific time by, ultimately, very large numbers of people. In these games, all viewers receive the same video (although it would be possible to switch between a small number of related channels for more sophisticated games), but, although the inability to interact directly with the video may be, considered to be too restrictive by those used to Video on Demand (VoD) and GoD, it allows conventional programming techniques to be used with live studio contestants, with whom many viewers will be able to empathize more readily than with animated figures.

Broadcast games have several advantages: First, the program can, and should, be designed so that it is interesting, even for those without the equipment, or desire, to interact. This ensures that the service providers receive at least the advertising revenue that they would from any other program. It encourages the purchase of equipment, since all will be able to watch the program and it will be quite clear to the viewer what they are missing. Secondly, there is a very low threshold for the viewer to decide to play a particular game since the decision can be taken at the time of the broadcast is scheduled, and there is no cost when they start to play. Thirdly, prizes can be offered to those playing at home, who will make a premium rate telephone call to register their score, giving an extra opportunity of increasing the revenue. Prizes are awarded to a selection of these with the highest scores at the end of a complete game. This is likely to encourage many who see current "viewers' questions" as being no more than a lottery to enter, and some prizes could be allocated randomly among those who submit their scores so that those with lower scores are still likely to enter.

Figure 2:
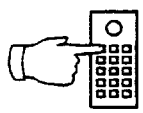
FIG. 2 shows an event sequence diagram illustrating how a viewer would take part in an interactive game.
Figure 2:
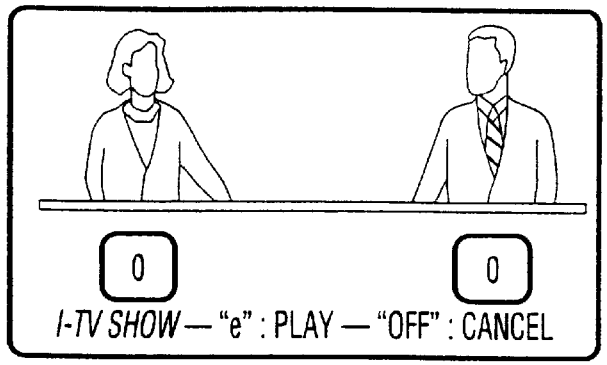
Figure 2:
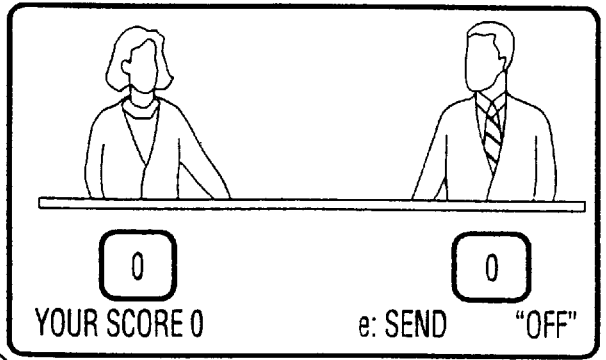
Figure 2:
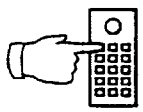
Figure 2:
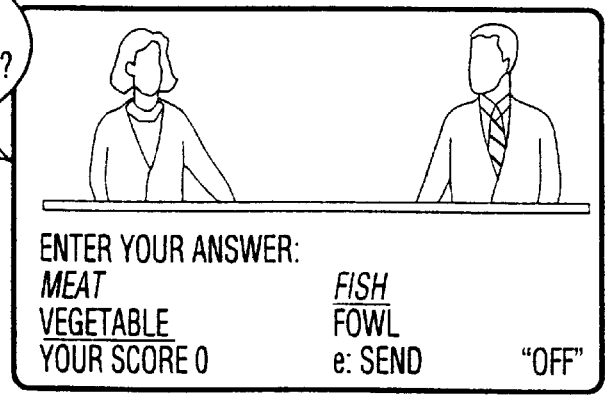
Figure 2:
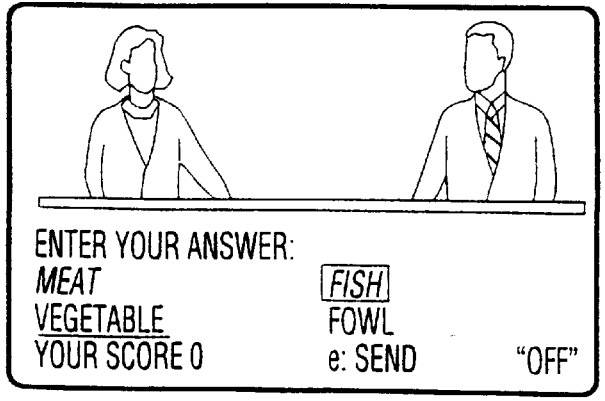

FIG. 2 shows an event sequence diagram showing how the user would activate the application and answer a question in a multiple choice (MC) general knowledge quiz, in which the potential answers are colored coded and mapped onto the remote control menu keys. This has the following steps:

1. The television receiver monitors a particular teletext page continuously to detect whether an interactive television quiz (I-TVQ) program is being broadcast. When this occurs, a prompt is displayed asking the viewer whether they wish to participate.

2. If the viewer wishes to play then a button is pressed on the remote control unit and a display of their score is superimposed on the video.

3. As each question is asked, potential answers are displayed. These are colour-coded to match the remote control menu keys.

4. If the viewer selects an answer before the studio contestant starts to answer, then it is highlighted on the receivers display. The viewer is not allowed to alter his guess.

5. Input from the viewer is disabled while the studio guest is answering.

6. When the correct answer is given in the studio, the viewer is told whether their answer was correct and their score is updated.

7. Towards the end of the game, the viewers with the highest scores will be asked whether they want to play the last round of the game live. If they do, which is effected by pressing an appropriate button on the remote control unit, the television receiver's telephone interface telephones the studio and transmits their name and current score for display.

8. All subsequent RC input is routed directly to the TV studio, where it will update the score. The viewer connected to the studio with the highest score at the end of the game wins the main prize.

9. Viewers with lower scores continue to play, and can schedule their scores for later transmission to the television studio to have an opportunity of winning a lesser prize.

Figure 3:
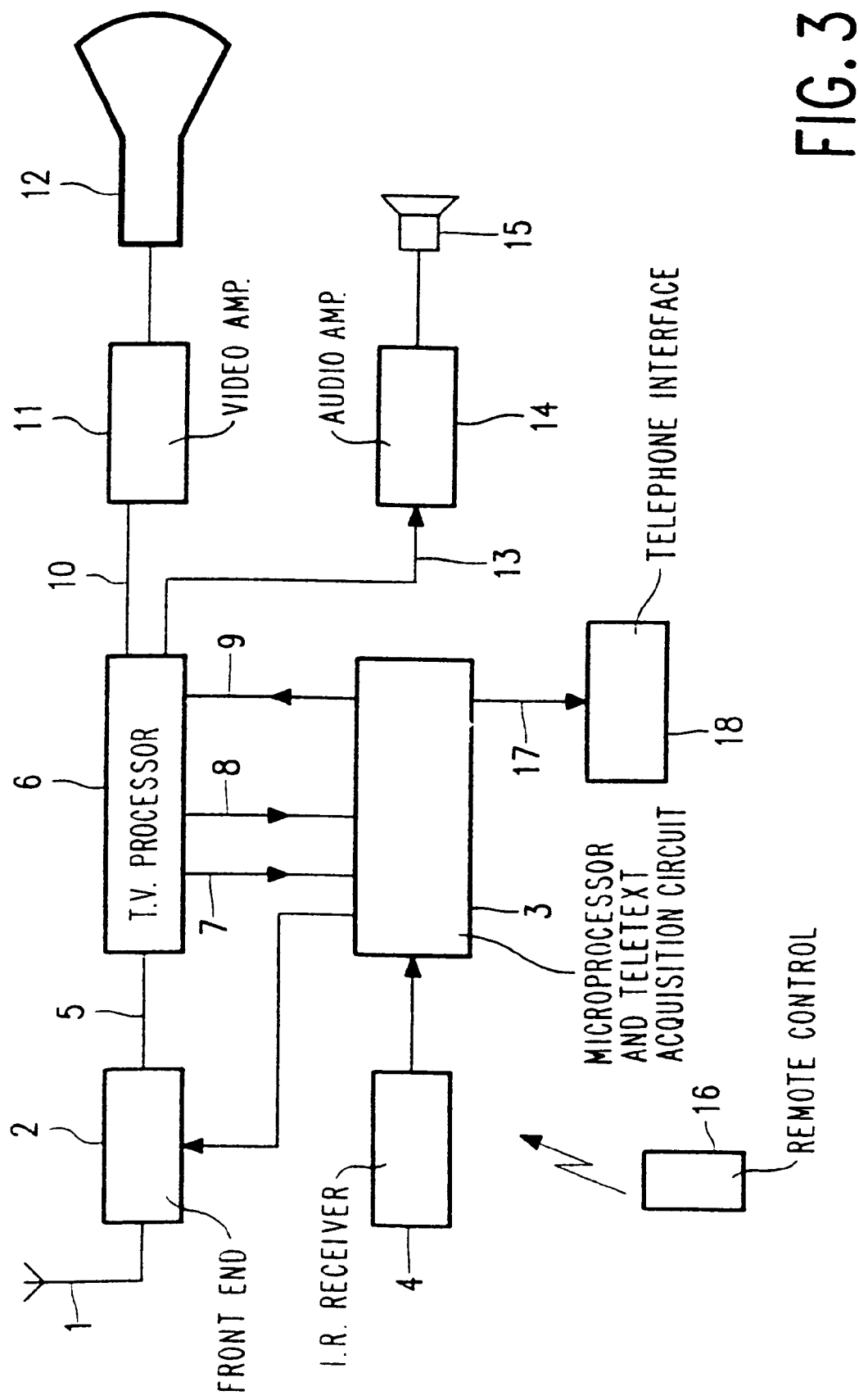
FIG. 3 is a block schematic diagram of a television receiver for use in the system of FIG. 1.

FIG. 3 shows, in block schematic form, an embodiment of a television receiver suitable for use in the system shown in FIG. 1 for enabling the participation in interactive game shows.

As shown in FIG. 3, an aerial 1 is connected to the input of the front end 2 of a television receiver, the front, end performing the usual RF amplification, demodulation, and detection functions as is well known in the television art. The front end 2 operates under the control of a microprocessor and teletext acquisition circuit 3 which receives, from an infrared receiver 4, signals which represent the pressing of keys on a remote control unit 16. The demodulated video signal is passed over a path 5 to a T.V. processor 6. This provides the usual video signal processing to allow color decoding, the generation of synchronizing pulses, etc. A combined video and blanking signal is supplied over a line 7 to the microprocessor and teletext acquisition circuit 3, as are synchronising pulses over a line 8. These are the normal television horizontal and vertical synchronising pulses. The microprocessor and teletext acquisition circuit 3 provides an output over a line 9 which is an RGB signal which is fed to the television processor 6. The RGB signals are fed via a line 10 from the T.V. processor 6 to video amplifiers 11 and thence to a display device 12, while audio output signals are fed via a line 13 to audio amplifiers 14 and to a loudspeaker 15. The microprocessor 3 is further connected, over path 17, to a telephone interface 18 by means of which transmission to the television studio may be effected.

The telephone interface 18 may include an auto-dialer which is controlled by the micro processor 3 which may either store telephone numbers entered by the viewer using the remote control unit or may receive, via the auxiliary data channel, the number of the program provider's terminal. The telephone interface 18 may also include a normal telephone handset to enable the viewer to answer questions verbally once the telephone connection has been established. Alternatively, the viewer may continue to answer the questions using the remote control unit buttons. In that case, the microprocessor 3 will determine which button has been pressed and consequently which of the multiple choice answers has been selected. It will then signal, via the telephone interface 18, the answer selected by the viewer to the program supplier. This may be achieved using the standard multi-frequency codes used for dialing. Using these codes will also allow easy signalling of numeric answers if they are used instead of multiple choice answers.

As an alternative, the aerial 1, front-end 2, microprocessor and teletext acquisition circuit 3, infrared receiver 4, T.V. processor 6, and telephone interface 18, could be incorporated in a "set-top" decoder box which feeds a RGB signals and audio signals to the video amplifiers 11 and audio amplifier 14 respectively. "Set-top" decoder boxes are known for use with satellite television signals where the transmission standard may be different from the standard for which the television receiver was designed. The partition of functions between the "set top" decoder box and receiver may vary and, in particular, the "set-top" decoder box may decode the received signal to produce RGB and audio signals or may re-encode then to PAL, SECAM or NTSC standards. In the latter case, it may feed a combined video and blanking signal (CVBS) into the TV processor 6 or may remodulate the CVBS signal into a spare terrestrial channel and feed that signal to the front-end 2 of the television receiver via an aerial socket.

Decoder boxes may also, or alternatively, include means for decoding one or more of the proposed digital television signals or be used in Cable Television Systems, including access and payment control systems. In that case, they may also include smart card readers and decryption circuitry. Such decoders are in themselves well known to persons skilled in the art.

Such a decoder box may also be used in Cable Television Systems to include the means for selecting the particular channel to be viewed and possibly de-scrambling circuitry to allow access to pay-per view programs. It may also include means for communication with the program provider over a return path in the cable network.

Figure 4:
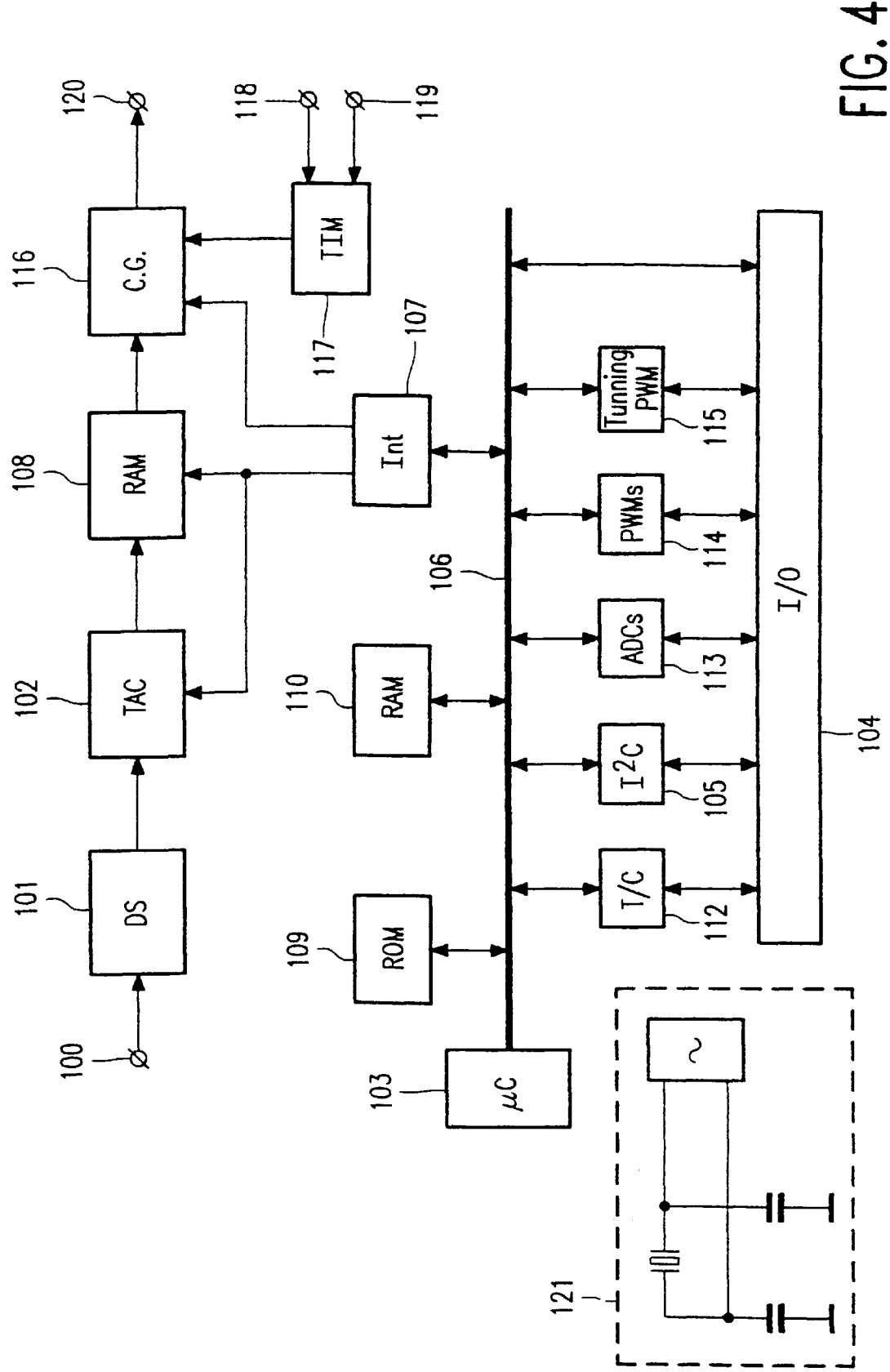
FIG. 4 is a block diagram of the microprocessor and teletext acquisition circuit of the television receiver shown in FIG. 3.

FIG. 4 shows, in greater detail, the microprocessor and teletext processing circuit 3 shown in FIG. 3. The arrangement has an input 100 which is fed to a data slicer 101. The input 100 receives the combined video and blanking signal (CVBS) which is present on line 7. The data slicer feeds a teletext acquisition circuit 102 which acquires and decodes the teletext transmissions. A microprocessor 103 receives, via input/output ports 104 over an I$^2$C Bus 105, control information from a remote control unit by means of which the viewer can select a program to be viewed and/or other facilities such as teletext and on screen displays. The micro processor 103 puts out instructions over a bus 106 via an interface 107 to the teletext acquisition circuits 102 which causes it to acquire a selected page. A selected page is fed into a page memory 108. Also attached to the bus 106 is a read-only memory 109, a random access memory (RAM) 110, timer counter circuits 112, analog to digital converters 113, pulse width modulators 114, and a tuning pulse width modulator 115. These are all connected to the other circuits within the television receiver through the input/output ports 104. The microprocessor 103 is also connected via the bus 106 and interface circuit 107 to the page RAM 108 and to a teletext character generator 116. The character generator 116 also receives timing pulses from a display timing generator 117 which is fed via input 118 and 119 with the vertical and horizontal synchronizing pulses. The character generator 116 produces an RGB output at 120 which is fed over the line 9 to the T.V. processing circuits for amplification and application to the display device. The micro controller 103 also receives clock pulses from a clock generator 121.

The telephone interface 18 is connected via the I$^2$C bus to the microprocessor 103 which generates the appropriate signals for passing live participation requests to the studio and also to pass the answers to subsequent questions decoded from the key depressions on the remote control unit. In addition, the microprocessor passes the accumulated score to the broadcaster through the telephone interface either when live participation in the final stages is invited and accepted, or at the end of the show for those who are not live participants.

The question answers, i.e., the multiple choices and correct choice, and the allocated marks for the question are transmitted as a teletext page by the broadcaster and detected and decoded by the teletext acquisition circuit 102 and stored in the RAM 110. The microprocessor will process this information and cause the multiple choice answers to be displayed (but not, of course, the correct choice) and optionally the marks available. When the viewer makes the selection by pressing a key on the remote control unit 16 the microprocessor 103 causes this to be compared with the correct answer stored in the RAM 110 and allocates marks depending on the correctness of the answer. The score is stored in the RAM 110 and updated as each question is asked and answered. The multiple choice answerers may be transmitted before the question is asked and enabled by a signal transmitted as the question is being asked.

The viewer may be given a fixed time interval to answer the questions, which interval can be controlled by the microprocessor, but when competing with a studio contestant this is not normally satisfactory. Consequently, it is desirable for the broadcaster to transmit an inhibit signal, in this example using teletex data transmission, which is detected by the teletext decoder and passed to the microprocessor which then inhibits action on the remote control key depressions and indicates on the screen that answers are too late.

At a selected stage in the game, the broadcaster invites those viewers having a qualifying score to participate live by sending a teletext page specifying the qualifying score and containing the invitation. The teletext decoder passes this to the microprocessor which causes the invitation to be displayed to the viewer. Preferably, the microprocessor first compares the qualifying score with that of the viewer stored in the RAM 110 and only displays the invitation if the qualifying score has been reached. An alternative is for the microprocessor to inhibit requests by the viewer if the qualifying score has not been reached but this is less satisfactory as the viewer may think there is a fault and repeatedly try to enter such requests leading to frustration.

While the specific description has described a system in which the auxiliary data is transmitted as teletext, data, this is not essential to the invention but enables currently available technology and facilities commonly available in conventional television receivers to be utilized. Any auxiliary channel could be used provided that it has sufficient security, i.e., it is not easy for the viewer to extract the transmitted correct answers or to disable the inhibit signal. It is preferable that the auxiliary data channel lies within the standard television channel in order to keep the receiver complexity as low as possible.

Other input devices could be used to enter the answers, for example, a voice input using voice recognition technology which could be incorporated in the television receiver. Another possibility would be a pointing device which could point at displayed multiple choice answers. The number of multiple choice answers is arbitrary and consequently a more comprehensive remote control unit could enable a greater number of choices.

Instead of multiple choice answers, the game could be arranged so that numeric answers are required. In this case the number keys on the remote control unit could be used for entering the answers.

An alternative input device could be a touch sensitive screen where the viewer touched the portion of the screen where the potential answer was shown.

From reading the present disclosure, other modifications will be apparent to persons skilled in the art. Such modifications may involve other features which are already known in the design and use of interactive television systems and component parts thereof and which may be used instead of or in addition to features already described herein. Although claim have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of enabling viewers to take part in a television quiz show with studio participants using an interactive television system, the method comprising the steps of:
   i) transmitting, live, a quiz show in which questions are asked of studio participants;
   ii) transmitting answers to the questions at an appropriate time in the program;
   iii) transmitting a signal which determines a time during which viewers are allowed to answer the questions;
   iv) allocating scores to correctly answered questions;
   v) at a given time during the quiz show, inviting viewers who have accumulated a qualifying score to take part, live, in the quiz show with the studio participants;
   vi) providing each of the invited viewers with a communication link to the studio to enable live participation;
   vii) receiving answers in real time from the invited viewers for the remainder of the quiz show; and
   viii) accumulating the scores of both the invited viewers and the studio participants to determine the winner(s).

2. A method as claimed in claim 1, wherein the communication link comprises a line in a public telephone network.

3. A method as claimed in claim 1, wherein the communication link comprises a return channel in a cable television network.

4. A method as claimed in claim 1, wherein the qualifying score is progressively reduced until sufficient viewer participants are obtained.

5. A method as claimed in claim 1, wherein said method further comprises transmitting an inhibit signal for each question, said inhibit signal determining an end of the time during which the viewer is allowed to answer the question.

6. A method as claimed in claim 1, wherein said answers comprise multiple choice answers transmitted to the viewers.

7. A method as claimed in claim 1, wherein said method further comprises transmitting scores allocated to each question to enable total scores to be accumulated.

8. Television transmission apparatus for use in an interactive television system, the television transmission apparatus comprising:
   means for generating television signals representing a quiz show;
   means for generating answers to each of a plurality of questions asked and transmitting said answers in an auxiliary data channel; and
   means for generating, at a given point in the quiz show, a request signal inviting viewers of the quiz show to participate live on the remainder of the quiz show if the viewer's total score up to the time of receiving the request signal has reached at least a given value.

9. Television transmission apparatus as claimed in claim 8, wherein said television transmission apparatus further comprises means for transmitting an inhibit signal to prevent a viewer from answering a question after a studio participant has started to answer the question.

10. Television transmission apparatus as claimed in claim 8; wherein the answers are in the form of multiple choice answers to be displayed and a non-displayable correct answer for comparison with an answer selected by the viewer.

11. Television transmission apparatus as claimed in claim 8, wherein said television transmission apparatus further comprises means for transmitting a score for each question.

12. Television transmission apparatus as claimed in claim 8, wherein the auxiliary data channel is carried in a vertical blanking interval of the television signal.

13. Television transmission apparatus as claimed in claim 12, wherein the auxiliary data channel carries teletext data, said television transmission apparatus comprising means for encoding the answers in one or more teletext data packets.

14. Television transmission apparatus as claimed in claim 8, wherein said television transmission apparatus further comprises means for reducing the given value until sufficient participants are obtained.

15. A method of generating a television signal representing a quiz show for use in an interactive television system, the television signal, said method comprising the steps of:

i) generating answers to each of a plurality of questions asked and inserting the answers in an auxiliary data channel; and ii) generating, at a given point in the quiz show, a request signal inviting viewers of the quiz show to participate live on the remainder of the quiz show if their total score up to the time of receiving the request signal is equal to or exceeds a given amount.

16. A method as claimed in claim 15, wherein said method further comprises the step of generating an inhibit signal to prevent a viewer from answering a question after a studio participant starts to answer the question.

17. A method as claimed in claim 15, wherein said method further comprises generating answers in the form of multiple choice answers for display by the viewer; and generating the correct answer for comparison with the answer selected by the viewer.

18. A method as claimed in 15, wherein said method further comprises the step of:

iii) generating a score for each question; and iv) transmitting the score in association with the question or the answers thereto.

19. A television receiver for use in an interactive television system, said television receiver comprising:

means for receiving a television signal representing a quiz show;

means for receiving, via an auxiliary data channel, answers to each question posed in the quiz show;

means for enabling a viewer to answer each question posed;

means for comparing the viewer's answer with a correct answer and allocating a score for that answer on the basis of the result of the comparison;

means for accumulating the scores for each of the questions;

means for receiving a signal inviting viewers whose accumulated scores at least reach a given value, to participate live in the remainder of the quiz show; and means for requesting participation in the rest of the show if the accumulated score reaches the given value.

20. A television receiver as claimed in claim 19, wherein said answers received by said receiving means comprise multiple choice answers to the questions posed together with an indication of the correct answer, the television receiver further comprising:

means for displaying the multiple choice answers;

means for enabling the viewer to select one of the multiple choice answers; and means for comparing the selected answer with the correct answer.

21. A television receiver as claimed in claim 19, wherein said television receiver further comprises means for receiving an inhibit signal; and means for preventing the viewer from entering an answer after receipt of the inhibit signal.

22. A television receiver as claimed in claim 19, wherein the auxiliary data channel is a teletext data channel and the answers are encoded and transmitted in one or more teletext data packets, the television receiver comprising a teletext decoder; and means for storing the correct answer for comparison with the viewer's answer.

23. A television receiver as claimed in claim 22, wherein the inhibit signal is transmitted in a teletext packet.

24. A television receiver as claimed in claim 19, wherein the means for enabling the viewer to answer the questions comprises a remote control unit.

25. A decoder for use in an interactive television system, said decoder comprising:

means for receiving and decoding a television signal representing a quiz show;

means for receiving, via an auxiliary data channel, and decoding answers to each question posed in the quiz show;

means for enabling a viewer to answer each question posed;

means for comparing the viewer's answer with the correct answer and allocating a score for that answer on the basis of the result of the comparison;

means for accumulating the scores for each of the questions;

means for receiving a signal inviting viewers, whose accumulated scores at least reach a given value, to participate live in the remainder of the quiz show;

means for requesting participation in the rest of the quiz show if the accumulated score reaches the given value; and means for feeding the decoded television signal to a television receiver.

26. A decoder as claimed in claim 25, wherein said answers are in the form of multiple choice answers to the questions posed together with an indication of the correct answer, the decoder comprising means for enabling the viewer to select one of the multiple choice answers; and means for comparing the selected answer with the correct answer.

27. A decoder as claimed in claim 25, wherein said decoder further comprises means for receiving an inhibit signal; and means for preventing the viewer from entering an answer after receipt of the inhibit signal.

28. A decoder as claimed in claim 25, wherein the auxiliary data channel is a teletext data channel and the answers are encoded and transmitted in one or more teletext data packets, the decoder comprising a teletext decoder; and means for storing the correct answer for comparison with the viewer's answer.

* * * * *